S. FURNAS.
DITCHING-PLOWS.
No. 194,865. Patented Sept. 4, 1877.
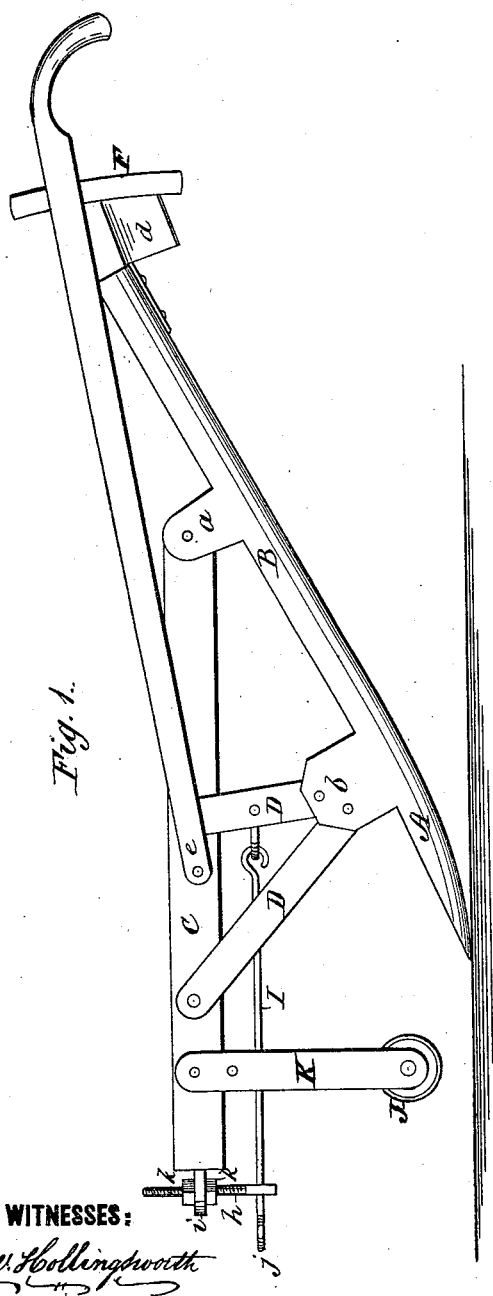
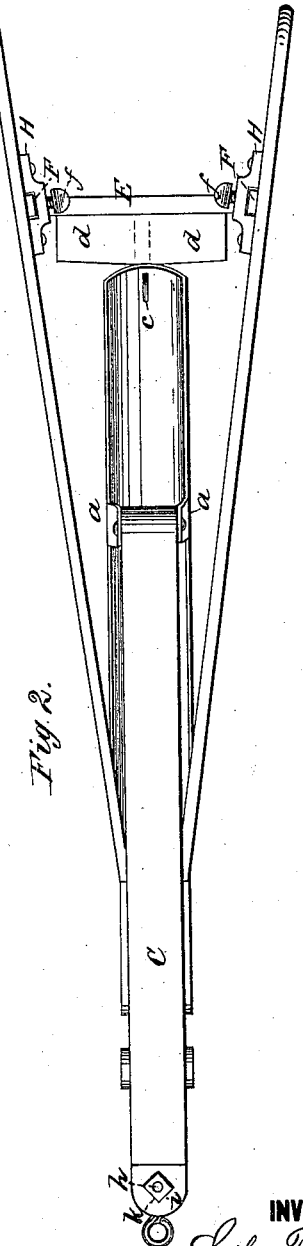
WITNESSES:
W. W. Hollingsworth
Edw. W. Byrn
INVENTOR:
Seth Furnas
BY
ATTORNEYS.

UNITED STATES PATENT OFFICE.

SETH FURNAS, OF BRIDGEPORT, INDIANA.

IMPROVEMENT IN DITCHING-PLOWS.

Specification forming part of Letters Patent No. 194,865, dated September 4, 1877; application filed July 18, 1877.

*To all whom it may concern:*

Be it known that I, SETH FURNAS, of Bridgeport, in the county of Marion and State of Indiana, have invented a new and Improved Ditching-Plow; and I do hereby declare that the following is a full, clear, and exact description of the same, reference being had to the accompanying drawing, forming part of this specification, in which—

Figure 1 is a side view, and Fig. 2 a plan.

My invention relates to certain improvements in ditching-plows; and it consists, first, in the particular construction and arrangement of a scoop-shaped plow extended upwardly and rearwardly in the form of an inclined trough, and combined with the beam and handles; and, secondly, in the particular construction and arrangement of devices for supporting and adjusting the handles upon the rear extension of the trough, as hereinafter more fully described.

In the drawing, A represents the plow, made from wrought-metal plate in the shape of a scoop, which scoop is extended upwardly and to the rear in an inclined position, in the form of a trough, B. The said scoop and trough are formed with upturned plates $a\ a$ and $b\ b$, from the same piece of metal, which plates form the means of attachment to the beam C, the upper set of plates $a$ being bolted directly to the opposite sides of the rear end of the beam, while the lower plates $b$ are bolted to bars D D that diverge at their upper ends, and are themselves bolted to the beam. This arrangement serves to secure the scoop and trough to the beam in a strongly-braced manner, and in the proper inclined position.

The upper rear end of the trough B is provided with a central cutting-blade, $c$, and beyond the same is extended laterally, and bent down on each side to form double-inclined shelves or chutes $d\ d$. As the soil passes up the trough from the advance of the plow through the ground, the blade $c$ first divides it longitudinally, and one half then passes upon one and the other upon the other of the two chutes $d\ d$, which latter deliver it to the ground upon each side of the ditch dug, where it will not fall back into the same. To the upper end of the trough is also attached a cross-bar, E, carrying at each end vertical and right-angular guide-bars F F. These guide-bars are curved to suit the radius of the handles G G, and pass through keepers H H, attached to the said handles, so that the latter may be adjusted radially upon their front bolts $e$, in order to regulate their height at the rear, which adjustment is fixed and determined by set-screws $f$, passing through the keepers H, and engaging with the guide-bars.

I is a draft-bar, arranged beneath the plow-beam, and hooked directly to a loop formed on one of the brace-bars D of the plow, so that the strain shall be transmitted directly to the plow. This bar is extended forwardly through the eye of an eyebolt, $h$, and terminates in a loop or eye, $j$, to form a draft attachment. This eyebolt $h$ is screw-threaded at its upper end, and passes through a plate, $i$, in the end of the beam. This bolt may be raised or lowered to raise or lower the draft attachment, and it is fixed in its adjustment by means of the screw-nuts $k\ k$ on opposite sides of the plate $i$. This adjustment of the draft attachment, together with the adjustment of the handles before described, permits the scoop and trough to be varied in inclination to the earth according to the stiffness of the soil.

J is a gage wheel or roller, arranged in bearings in the pendent supporting-bars K, which bars are bolted to the beam just in front of the plow, and are made vertically adjustable through a series of holes, in order to regulate the depth of the ditch to be plowed.

In defining more clearly the limits of my invention, I would state that I do not claim, broadly, a continuous plow and trough, but only the improved arrangement of the same to the other parts.

I also further disclaim the broad idea of making the handles adjustable, and confine this feature to the particular adjusting devices which not only permit one handle to be adjusted independently of the other, but also form a support for the rear end of the plow when not in use.

Having thus described my invention, what I claim as new is—

1. A ditching-plow consisting of the combination of a beam, C, the brace-bars D D, the handles G, and the inclined scoop and trough A B, bolted to the said brace-bars and rear end of the beam, and arranged to support the handles at its extremity, substantially as and for the purpose described.

2. The combination, with the rear extension of the trough B, and the handles G having keepers H, of the cross-bar E having guide-bars F, and the set-screws $f$, substantially as and for the purpose described.

SETH FURNAS.

Witnesses:
JACOB PACE,
WILLIAM P. NICKERSON.